R. LÉPINE.
SHOCK ABSORBER.
APPLICATION FILED DEC. 10, 1909.
954,526.
Patented Apr. 12, 1910.
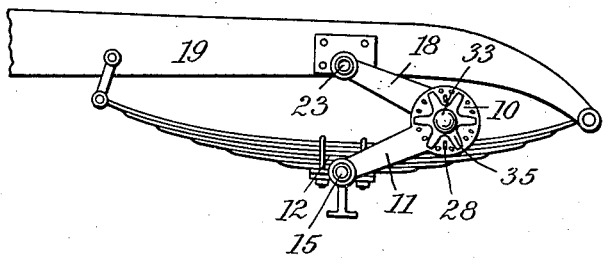
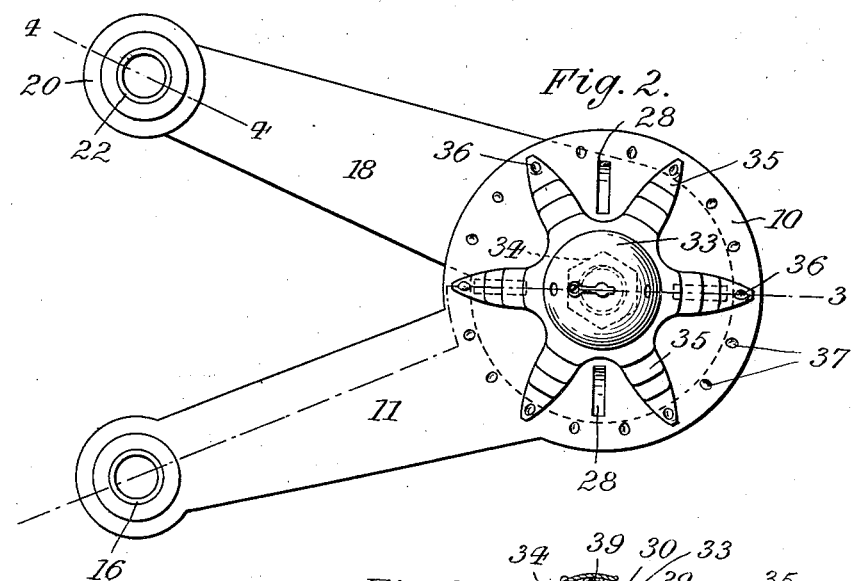
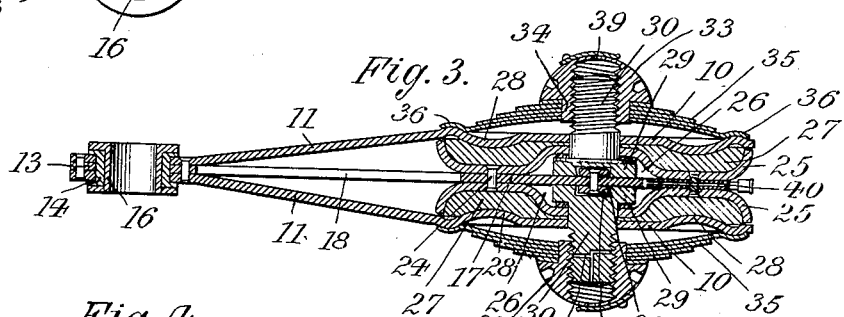
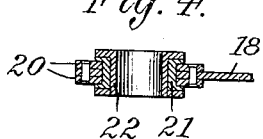
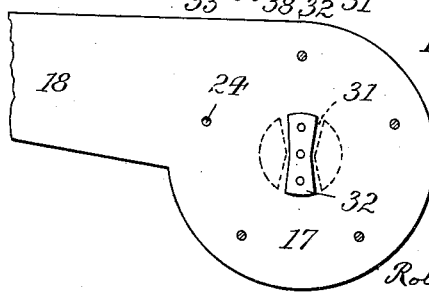
WITNESSES:
INVENTOR
Robert Lépine
BY
ATTORNEY

UNITED STATES PATENT OFFICE.

ROBERT LÉPINE, OF NEW YORK, N. Y.

SHOCK-ABSORBER.

954,526.                     Specification of Letters Patent.     Patented Apr. 12, 1910.

Application filed December 10, 1909. Serial No. 532,314.

*To all whom it may concern:*

Be it known that I, ROBERT LÉPINE, a citizen of Russia, residing at New York city, Manhattan, county and State of New York, have invented new and useful Improvements in Shock-Absorbers, of which the following is a specification.

This invention relates to a shock absorber of novel construction, by which a gradually increasing resistance is interposed between a car body and its running gear during the downward sway of the car body, as well as during the rebound thereof, so that light and smooth running is insured.

In the accompanying drawing: Figure 1 is a side view of part of a car showing it provided with my improved shock absorber; Fig. 2 a face view of the absorber detached; Fig. 3 a section on line 3—3, Fig. 2; Fig. 4 a section on line 4—4, Fig. 2, and Fig. 5 a detail of part of one of the brake-carrying arms.

The shock absorber comprises essentially a pair of disks 10 provided with integral converging arms 11 which are adapted to be pivotally connected to the running gear 12 of a car in suitable manner. As shown, arms 11 are perforated near their free ends and are spaced by an interposed apertured plate 13, the perforations serving for the accommodation of a flanged sleeve 14 that turns on a bolt 15 of running gear 12 and incloses a packing 16. Intermediate disks 10 is located a third disk 17 integral with an arm 18 fulcrumed to the body 19 of the car. The connection between this arm and body 19 is similar to the connection between arms 11 and running gear 12. Thus the perforated end of arm 18 is flanked by a pair of perforated disks 20 adapted for the reception of a flanged sleeve 21 having packing 22 and turning on bolt 23 of body 19.

To opposite sides of inner disk 17 are attached, by rivets 24, first brake-members 25. These members are shown to be made of annular form with outwardly turned flanges and inner bulges to form centrally located pockets 26. The second brake-members comprise annular shoes 27, made of wood, rubber or other suitable material and operatively connected to disks 10 by bosses 28 of such disks, which are sunk into said shoes. Within pockets 26 are received the heads 29 of a pair of screws 30 extending in opposite directions through the openings of brake-members 25, 27 and through corresponding openings of disks 10. Screws 30 are so connected to disk 17 that they will be turned by a partial rotation of such disk relatively to disks 10. To this effect, the nicks 31 of screw-heads 29 are adapted to accommodate keys 32 secured to disk 17. It is preferred that nicks 31 flare toward both ends, (Fig. 5,) so that there is a slight play between heads 29 and keys 32 for a purpose hereinafter described. Each screw 30 engages a nut 33 having an angular shank 34 which passes through angular eyes of a series of superposed perforated leaf springs 35, said springs bearing with their edges against disks 10 and being preferably of the stellated form shown. By setting nuts 33 the tension of springs 35 may be adjusted, so that in this way the pressure between brake-members 25, 27 is regulable. In order to normally maintain the relative position between springs 35 and disks 10, the points of the former are cupped as at 36 to engage corresponding bosses 37 of the latter. As the angular eyes of springs 35 engage the angular shanks 34 of nuts 33, the locking of the springs against rotation will likewise lock the nuts against rotation during the normal operation of the device. The consequence is that as screws 30 are turned in either one or the other direction, the nuts will be moved either inward or outward along such screws. Screws 30 have ducts 38 for the reception of a lubricant introduced through openings 39 of nuts 33. A lubricant may also be fed through a duct 40 of disk 17 into pockets 26.

In operation, a jolting action of the car will cause arms 11, 18 to alternately approach each other or close and recede from each other or open. In this way, disk 17 will receive a slight rotation relatively to disks 10, so that screws 30 will correspondingly turn in their nuts 33. During the closing action of arms 11, 18, one of the screws 30, (lower screw, Fig. 3,) will draw its nut inward to gradually increase the tension of its spring 35 and thereby correspondingly increase the frictional engagement of its brake-members 25, 27. Upon the opening of arms 11, 18, the other screw 30, (upper screw, Fig. 3,) will draw its nut inward, so that the tension of the second spring 35 and the frictional contact of the second pair of brake-members 25, 27 is gradually increased. The result of the entire arrangement therefore is that the shock is absorbed with gradually increased resistance during the descent, as well as during the rebound of the car body, so that objectionable jolting is effectively prevented. By providing the slight play described, intermediate screw heads 29 and keys 32, the small regular vibrations of the car may take place without actuating the shock absorber, thus preventing unnecessary wear of the latter.

It is obvious that in lieu of connecting the screws to the inner disk and the nuts to the springs, the nuts can be connected to the inner disk while the screws engage the springs.

I claim:

1. A shock absorber comprising an inner arm, and a pair of outer arms, coöperating brake-members carried by the arms, a pair of springs locked to the outer arms, a pair of screws extending from opposite sides of the inner arm, and a pair of nuts which engage the screws and are locked to the springs.

2. A shock absorber comprising an inner arm, and a pair of outer arms having bosses, coöperating brake-members carried by the arms, a pair of cupped springs that engage the bosses and have angular eyes, a pair of angular nuts engaging said eyes, and a pair of screws that extend from opposite sides of the inner arm and engage the nuts.

3. A shock absorber comprising a first arm, first brake-members on opposite sides thereof, a pair of second arms, second brake-members secured thereto, springs influencing the frictional engagement of the brake-members, nuts engaging the springs, screws engaging the nuts, and keys on the first arm that movably engage the screws.

4. A shock absorber comprising a first arm, a bulged first brake-member secured thereto and forming an intervening pocket, a screw having a head that is received within said pocket and is operably connected to the first arm, a second arm carrying a second brake-member, a spring influencing said second brake-member, and a nut engaging the spring and engaged by the screw.

Signed by me at New York city, (Manhattan,) N. Y., this 9th day of December, 1909.

ROBERT LÉPINE.

Witnesses:
WILLIAM R. SCHULZ,
FRANK V. BRIESEN.